Oct. 5, 1971
G. M. ROSE
3,609,913
MAGNETIC MEMORY CONTROL
Filed July 24, 1969
2 Sheets-Sheet 1
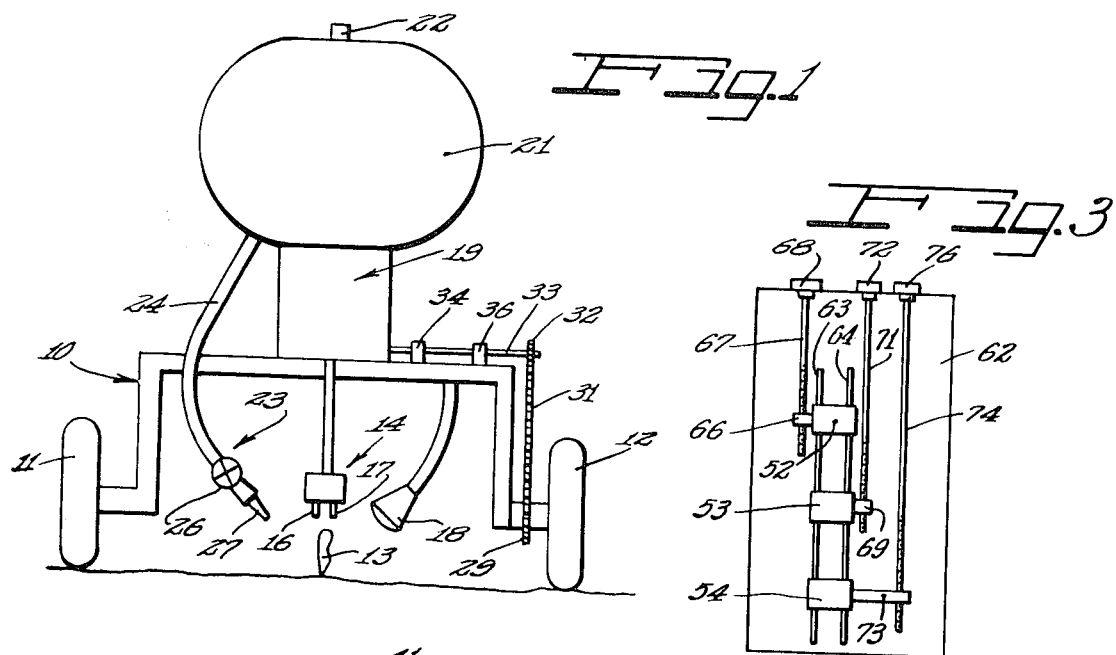
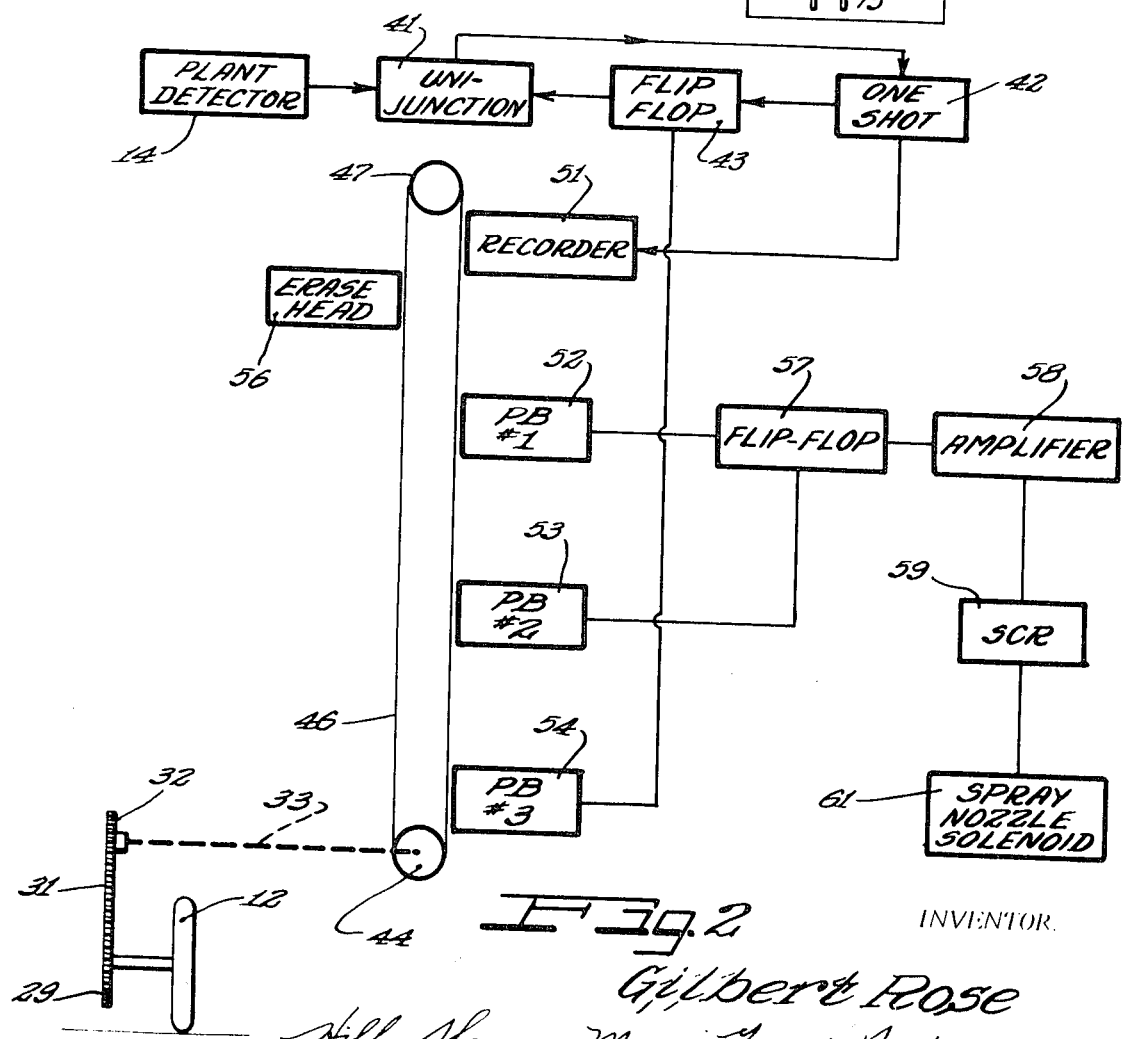
INVENTOR.
Gilbert Rose

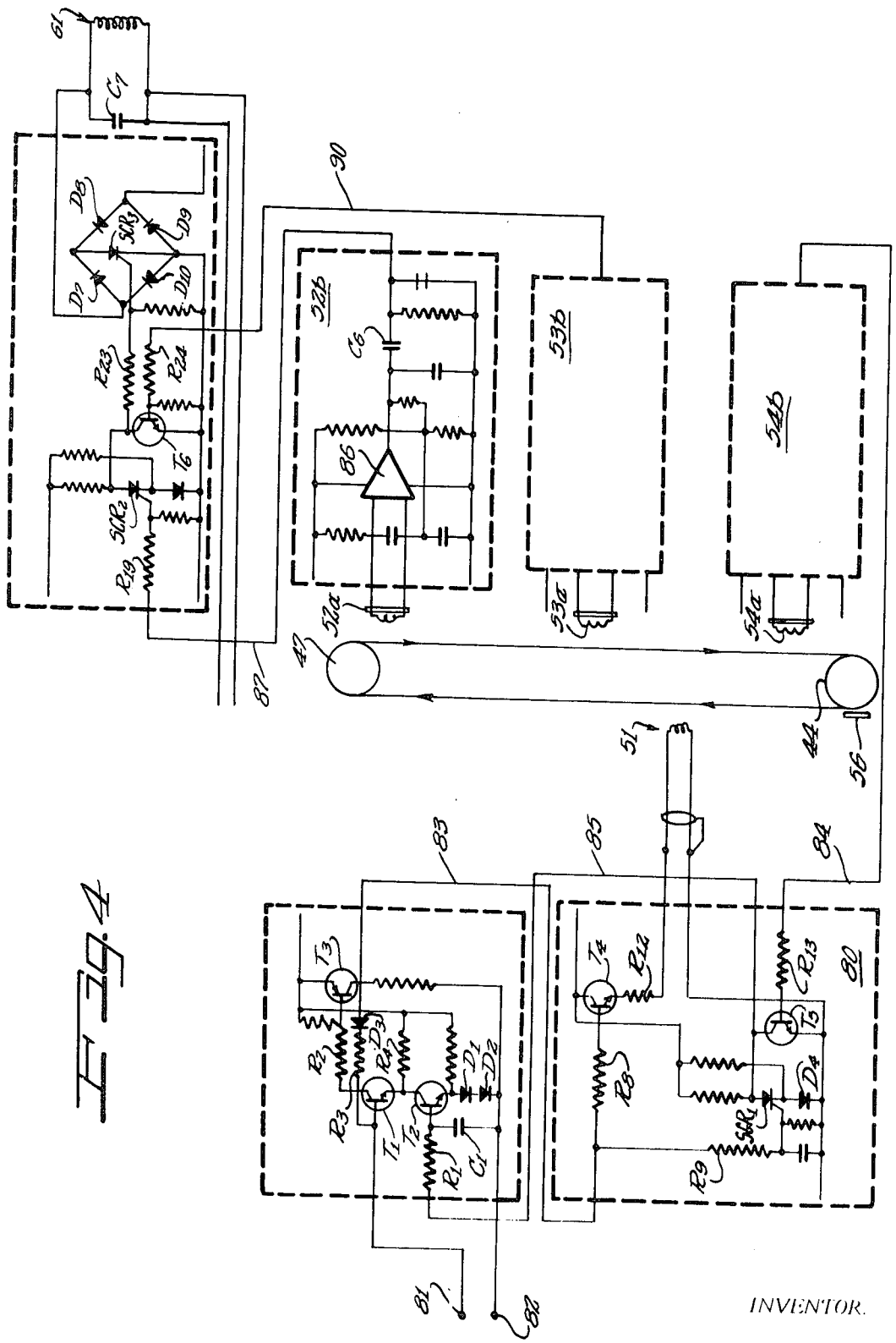

United States Patent Office 3,609,913
Patented Oct. 5, 1971

3,609,913
MAGNETIC MEMORY CONTROL
Gilbert M. Rose, Nampa, Idaho, assignor to International Electric Fence Company Inc., Albert Lea, Minn.
Filed July 24, 1969, Ser. No. 844,555
Int. Cl. A01b *41/00*
U.S. Cl. 47—1.43
6 Claims

ABSTRACT OF THE DISCLOSURE

An agricultural machine which is moved along the ground over a row of plants and which has a plant detecting means for sensing the presence of plants and which controls a herbicide sprayer so as to selectively destroy plants in the row. An electronic control system detects the output of the plant detecting means and controls the herbicide sprayer to allow selective spacing of the plants.

BACKGROUND OF THE INVENTION

Field of the invention

This invention relates to agricultural machinery and in particular to a machine for selectively removing plants.

Description of the prior art

Prior agricultural machines for removing plants have incorporated plant sensors which control mechanical cutters or hoes that remove plants. The adjustment of such machines is limited due to the fixed width of the hoes. The mechanical hoes disturb the earth and break the lateral feeder roots of the plants which are to be left in the field which can result in a 10 to 15% loss in production.

SUMMARY OF THE INVENTION

The present invention comprises an agricultural machine formed with a frame member mounted on ground wheels and having a plant detector which controls the application of herbicide that is sprayed on the plants to selectively remove them.

An electronic control means is connected to the plant detector and herbicide sprayer and is adjustable to control the length of plants left in each group and the length of plants destroyed between each group of plants.

Other features and advantages of the present invention will be readily apparent from the following detailed description of certain preferred embodiments thereof taken in conjunction with the accompanying drawings.

Brief description of the drawings

FIG. 1 illustrates the agricultural machine of this invention;

FIG. 2 is a block diagram of the machine of the invention;

FIG. 3 is a detail view illustrating how adjustments may be made for determining the number of plants left and the spacing between groups of plants; and FIG. 4 is an electrical schematic view of the control circuitry of the invention.

Description of the preferred embodiments

The agricultural machine of this invention is moved along a row of plants and has a plant detecting means which senses plants. The machine has a herbicide reservoir and spray which is controlled by a control means that is also connected to the plant detecting means to destroy plants in the row.

The plant detecting means might comprise an electric eye which becomes unbalanced when it detects a plant and produces an electrical output. An electronic control means receives an input from the plant detecting means and is connected to a herbicide dispenser to selectively control it so that certain plants are destroyed and selected plants are left in the field.

FIG. 1 illustrates the agricultural machine in this invention and comprises a frame member 10 which is supported on ground wheels 11 and 12 that fit on either side of a row of plants 13. A tractor (not shown) pulls the machine down the row. A plant detecting means 14 may comprise a pair of electric eyes 16 and 17 which receive energy reflected from the plant to detect it. At illuminating means 18 which might be an incandescent bulb is mounted on the frame 10 to illuminate the plants 13 so that energy is reflected to the detector 14. The detector 14 is connected by a support from the frame and by suitable electrical leads to a control unit designated generally as 19 which is mounted on the frame 10 of the machine.

A reservoir 21 for herbicide is mounted on the frame and has a filler cap 22. A herbicide dispenser 23 comprises a conduit 24 which is connected to the reservoir and has a valve 26 and an outlet nozzle 27 positioned to direct herbicide on the plants 13.

A gear 29 is driven by a ground wheel 12 and carries a belt 31 which passes over a second gear 32 mounted on a shaft 33 that is supported by suitable bearings 34 and 36 on the frame 10. Thus, as the machine moves over the ground the position of the machine is supplied through the belt 31 to the shaft 33 as an indicia of the machine's position.

FIG. 2 illustrates the control circuitry of the invention. The plant detector 14 is connected to a unijunction transistor 41 which supplies an output to a one-shot multivibrator 42. The one-shot multivibrator also supplies an input to a flip-flop circuit 43 which supplies an output to the unijunction transistor 41. The shaft 33 illustrated in FIG. 1 and FIG. 2 carries a pulley 44 which drives an endless belt 46 of magnetic tape. A second pulley 47 is mounted on a shaft 48 remote from pulley 44 and belt 46 passes over it. As the ground wheel 12 moves along the ground the pulley 44 is turned by the shaft 33 and the belt 46 is driven.

A recording head 51 is mounted in operational relationship with the belt 46 and receives an output from the one-shot multivibrator 42. Playback heads 52, 53 and 54 are mounted adjacent the belt of magnetic tape 46 so as to detect signals recorded thereon. An erase head 56 is also mounted adjacent the belt 46 for erasing signals on the tape 46.

A flip-flop circuit 57 receives input signals from the playback heads 52 and 53 and provides an output to an amplifier 58 which is connected to a silicon-controlled rectifier 59. A spray nozzle solenoid 61 is connected to the output of the SCR 59 and controls the position of the valve 26 of the herbicide dispenser 23.

FIG. 3 illustrates the means for mechanically adjusting the positions of the playback heads 52, 53 and 54 relative to the tape 46 so that the number of plants left and the distance between adjacent plants may be selected.

A frame 62 has a pair of guide rails 63 and 64 upon which the playback heads 52, 53 and 54 are slidably mounted. The head 52 is formed with a threaded extension 66 through which a threaded shaft 67 is received. A knob 68 is mounted on the shaft 67 and by rotating the shaft 67 with the knob 68 the position of the head 52 may be adjusted relative to its position on the rails 63 and 64.

A threaded extension 69 is connected to the head 53 and a threaded shaft 71 passes through it. A knob 72 is connected to shaft 71 and the position of the head 53 may be adjusted on the rails 63 and 64 by turning the shaft 72.

An extension 73 is connected to the head 54 and has a threaded opening through which the threaded shaft 74 extends. A knob 76 is mounted on the shaft 74 and the head 54 may be adjusted by turning the knob 76.

FIG. 4 is a schematic view of a modification of the invention. A pair of input terminals 81 and 82 are connected to the plant detector 14. The terminal 81 is connected to the base of a transistor $T_1$ which has its emitter coupled through the resistor $R_2$ to the base of transistor $T_3$. The emitter of transistor $T_1$ is connected to the emitter of transistor $T_3$ through the resistor $R_4$. An enable signal is supplied by the lead 85 through the resistor $R_1$ to the base of the transistor $T_2$ and the capacitor $C_1$ is connected between the base of transistor $T_2$ and terminal 82. A pair of diodes $D_1$ and $D_2$ are connected in series between the terminal 82 and the emitter of transistor $T_2$. An output signal is removed by lead 83 which is connected through diode $D_3$ to resistor $R_3$ which is connected to the base of transistor $T_1$. Lead 83 is connected to a record control 80 which has a transistor $T_4$ which receives the input signal from lead 83 through resistor $R_8$. An output from the emitter of transistor $T_4$ is supplied through the resistor $R_{12}$ to the record head 51. The other side of the record head 51 is connected to the emitter of transistor $T_5$. The emitter of transistor $T_5$ is connected to a diode $D_4$ which has its other side connected to the cathode of silicon-controlled rectifier SCR1. The collector of transistor $T_5$ is connected to the anode of SCR1 and the gate of SCR1 is connected through resistor $R_9$ to lead 83. An enable gate is connected from the emitter of SCR1 through lead 85 to resistor $R_1$. The base of transistor $T_5$ is coupled through the resistor $R_{13}$ to the lead 84 which is connected to the playback amplifier 54b that is connected to the playback head 54a of playback head 54. A first playback pickup head 52a picks up signals on the magnetic tape 46 and supplies an output to an operational amplifier 86 which provides an output through the capacitor $C_6$ to lead 87. Lead 87 controls the gate of SCR2 through resistor $R_{19}$. The gate of an SCR3 is coupled through resistor $R_{23}$ to the anode of SCR2. The SCR3 is connected in a diode bridge comprising the diodes $D_7$, $D_8$, $D_9$ and $D_{10}$ and the output of the bridge is connected to solenoid 61 for controlling the spray nozzle. A capacitor $C_7$ is connected in parallel with the solenoid 61. Lead 90 is coupled through the resistor $R_{24}$ to the base of transistor $T_6$ which has its collector connected to the anode of SCR2 and receives an output from playback amplifier 53b which receives an input from the playback head 53a.

In operation, the plant detector 14 produces an input signal at terminals 81 and 82 which produce an output at lead 83 that might be 10 volt, 5 millisecond in length. This signal is supplied to the record control 80 and is fed through the transistor $T_4$ to the recorder 51. The recorder 51 records a signal on the tape 46. The playback head 52 detects the signal recorded by the recorder 51 on the tape 46 and passes it to the operational amplifier 86 which passes an output through the lead 87 to gate SCR2 to control the solenoid 61 so that the valve is turned off to discontinue the application of herbicide. The recorded signal from recorder 51 passes from the playback head 52a to the playback head 53a where it is detected and the playback amplifier 53b is similar to playback amplifier 52b and produces an output on lead 90 which is coupled through the resistor $R_{24}$ to transistor $T_6$ to control the solenoid valve 61 so that the herbicide is again applied to the plants. The signal on the tape 46 then passes from playback head 53a to playback head 54a where it is detected and amplified in the amplifier 54b which is similar to amplifier 52b and the output is supplied through lead 84 to the base of transistor $T_5$ through resistor $R_{13}$ of the record control 80 to reset the record control so that another signal may be recorded on the tape 46. Only a single signal will be recorded on tape 46 until the playback amplifier 54b resets the record control 80 so that it will allow another signal from the plant detector to pass through the lead 83 to the recorder 51. The erase head 56 erases the prior signal recorded on the tape 46 before it reaches the record head 51 so that only the signal detected by the plant detector is recorded on the tape 46.

The adjustment mechanism illustrated in FIG. 3 allows the spacings between the playback heads 52, 53 and 54 to be adjusted for varying the number of plants left in each group and for also varying the distance between each group of plants.

It will be understood that modifications and variations may be effected without departing from the spirit and scope of the novel concepts of the present invention.

I claim as my invention:

1. An agriculture machine for thinning plants comprising:
   (a) a frame adapted to move along a row of plants;
   (b) an electronic plant detecting means mounted on said frame so as to sense the presence of plants;
   (c) a herbicide dispenser mounted on said frame so as to dispense herbicide on said plants;
   (d) a control valve for said herbicide dispense;
   (e) a distance measuring means including a recording means;
   (f) means for driving said distance measuring means when said machine moves;
   (g) an electronic control means receiving an input from said distance measuring means and said plant detecting means and supplying an output to said control valve to turn it on and off such that herbicide is not dispensed for a selected distance, said electronic control means including an electronic blocking gate which comprises:
   a unijunction transistor receiving the output of said plant detecting means;
   a one-shot multivibrator receiving the output of said unijunction transistor and supplying an output to said recording means for recording an output of said plant detecting means;
   a flip-flop circuit receiving an output of said one-shot multivibrator and supplying an output to said unijunction transistor, said flip-flop circuit receiving an input from said recording means;
   a first pick-up means mounted adjacent said recording means and connected to said control valve to turn off said herbicide dispenser;
   a second pick-up means mounted adjacent said recording means and connected to said control valve to turn on paid herbicide dispenser;
   a third pick-up means mounted adjacent said recording means and connected to said flip-flop circuit to enable it; and
   an erase head mounted adjacent said recording means.

2. An agriculture machine according to claim 1 including a silicon controlled rectifier which has its gate electrode connected to outputs of said first and second pick-up means and has its output connected to control said control valve.

3. An agriculture machine according to claim 1 wherein said recording means comprises magnetic tape.

4. An agriculture machine according to claim 3 wherein said magnetic tape is formed into an endless belt.

5. An agriculture machine according to claim 4 comprising, a pair of pulleys over which said endless belt passes and means for driving said belt as a function of the distance traveled by said machine.

6. An agriculture machine according to claim 1 comprising means for adjusting the distance between the first and second pick-up means to vary the turn off distance of said herbicide dispenser.

References Cited
UNITED STATES PATENTS

| | | | |
|---|---|---|---|
| 3,181,618 | 5/1965 | Miller | 172—6 |
| 3,358,775 | 12/1967 | Garrett | 172—6 |
| 3,452,822 | 7/1969 | Gugenhan et al. | 172—6 |
| 3,458,952 | 8/1969 | Tschudy | 47—1.43 |
| 3,468,380 | 9/1969 | Gompert | 172—6 |

FOREIGN PATENTS

| | | | |
|---|---|---|---|
| 1,528,205 | 4/1968 | France | 47—1.43 |

ROBERT E. BAGWILL, Primary Examiner

U.S. Cl. X.R.

172—6